(12) United States Patent
Nordberg et al.

(10) Patent No.: US 9,637,868 B2
(45) Date of Patent: May 2, 2017

(54) PHOSPHATED COMPOUNDS AS ADHESION PROMOTERS

(71) Applicant: Akzo Nobel Chemicals International B.V., Amersfoort (NL)

(72) Inventors: Johan Nordberg, Mölndal (SE); Daniel Hagberg, Kullavik (SE); Natalija Gorochovceva, Hjälteby (SE)

(73) Assignee: AKZO NOBEL CHEMICALS INTERNATIONAL B.V., Amersfoort (NL)

( * ) Notice: Subject to any disclaimer, the term of this patent is extended or adjusted under 35 U.S.C. 154(b) by 38 days.

(21) Appl. No.: 14/437,228

(22) PCT Filed: Oct. 29, 2013

(86) PCT No.: PCT/EP2013/072580
§ 371 (c)(1),
(2) Date: Apr. 21, 2015

(87) PCT Pub. No.: WO2014/067929
PCT Pub. Date: May 8, 2014

(65) Prior Publication Data
US 2015/0275441 A1 Oct. 1, 2015

Related U.S. Application Data

(60) Provisional application No. 61/721,621, filed on Nov. 2, 2012.

(30) Foreign Application Priority Data

Oct. 31, 2012 (EP) .................................... 12190852

(51) Int. Cl.
| | | |
|---|---|---|
| *E01C 7/00* | (2006.01) | |
| *E01C 7/35* | (2006.01) | |
| *C08K 5/521* | (2006.01) | |
| *E01C 19/46* | (2006.01) | |
| *C08K 5/49* | (2006.01) | |

(52) U.S. Cl.
CPC .................. *E01C 7/35* (2013.01); *C08K 5/49* (2013.01); *C08K 5/521* (2013.01); *E01C 7/00* (2013.01); *E01C 19/46* (2013.01); *C08L 2555/52* (2013.01); *C08L 2555/60* (2013.01); *C08L 2555/62* (2013.01)

(58) Field of Classification Search
CPC ... E01C 7/00; E01C 7/35; E01C 19/46; C08K 5/49; C08K 5/521; C08L 95/00; C08L 2555/52; C08L 2555/60; C08L 2555/62

USPC .......................................... 404/17–22, 27, 31
See application file for complete search history.

(56) References Cited

U.S. PATENT DOCUMENTS

| | | | |
|---|---|---|---|
| 2,177,983 A | 10/1939 | Harris | |
| 2,592,564 A | 4/1952 | Hardman | |
| 2,693,425 A | 11/1954 | Hardman | |
| 3,875,196 A | 4/1975 | Meguro et al. | |
| 4,162,998 A * | 7/1979 | Doi ........................ | C08G 59/50 404/72 |
| 4,296,006 A * | 10/1981 | Bugdahl ............. | C08G 59/1455 260/998.19 |
| 4,423,088 A * | 12/1983 | Graf .................... | C04B 20/1044 106/277 |
| 5,405,440 A * | 4/1995 | Green ................... | C08L 95/005 106/276 |
| 2013/0336720 A1* | 12/2013 | Jack ....................... | C08L 95/00 404/75 |

FOREIGN PATENT DOCUMENTS

| | | |
|---|---|---|
| CN | 1263098 A | 12/1999 |
| DE | 2446151 A1 | 4/1976 |
| EP | 0125852 A1 | 11/1984 |
| EP | 0157210 A1 | 10/1985 |
| EP | 0169812 B1 | 1/1986 |
| EP | 0899006 A2 | 3/1999 |
| EP | 0926191 A2 | 6/1999 |
| FR | 2971785 A1 | 8/2012 |
| GB | 1032465 | 6/1966 |
| JP | 2010195717 A | 2/2009 |
| KR | 20110081921 A | 7/2011 |

OTHER PUBLICATIONS

PCT Search Report and Written Opinion for Serial No. PCT/EP2013/072580 date of mailing Dec. 9, 2013.
EP Search Report for Serial No. EP12190852.9 dated Jun. 20, 2013.
Chemical Abstract; AN 117:146676 CA OREF 117:25341a; dated Oct. 17, 1992.

* cited by examiner

*Primary Examiner* — Raymond W Addie
(74) *Attorney, Agent, or Firm* — Nirav P. Patel

(57) ABSTRACT

A bitumen containing composition, comprising bitumen and a phosphate compound, which is obtainable by the esterification of a polyhydric alcohol having at least three hydroxyl groups, with a carboxylic acid having 8-24 carbon atoms, preferably 12-22 carbon atoms, or a derivative thereof, wherein at least one but not all of the hydroxyl groups are esterified, provided that when the polyhydric alcohol has 5 or more hydroxyl groups then at least two but not all of the hydroxyl groups are esterified, followed by reacting the ester obtained with a phosphatising reagent; wherein the said composition is not a bitumen-in-water emulsion.

19 Claims, No Drawings

US 9,637,868 B2

PHOSPHATED COMPOUNDS AS ADHESION PROMOTERS

This application is a national stage filing under 35 U.S.C. §371 of PCT/EP2013/072580, filed Oct. 29, 2013, which claims priority to U.S. Provisional Patent Application No. 61/721,621 filed Nov. 2, 2012, and European Patent Application No. 12190852.9, filed Oct. 31, 2012, the contents of which are each incorporated herein by reference in their entireties.

TECHNICAL FIELD OF INVENTION

The present invention relates to the use of a phosphated compound to promote adhesion between bitumen and aggregates in an asphalt composition. Further, the present invention relates to a composition comprising bitumen and the phosphated compound.

TECHNICAL BACKGROUND OF THE INVENTION

Asphalt pavements basically consist of two main components; bitumen and aggregate. The function of bitumen is to act as a binder in between the aggregate skeleton, giving the asphalt sufficient internal cohesion. It is therefore of vital importance that the bitumen has a strong bond (adhesion) to the aggregate surface.

The fact that roadways can suffer water damage is well established. The visible symptoms of water damage are various and include rutting and shoving, deformation, loss of chippings from surface dressings (chip seals), and raveling of surface layers. This leads to rough surfaces and eventually potholes, loss of structural strength, susceptibility to freeze-thaw damage and cracking. The underlying problem on a micro scale is loss of adhesion between the bitumen and the aggregate surface. Even though the aggregate is fully coated with bitumen, water could penetrate the bitumen film by various means, as for instance through wearing of thin bitumen films at sharp aggregate edges.

In common terms, bitumen is an oily material and therefore very hydrophobic. Bitumen has much less affinity for the aggregate surface than water has, and it does not adhere easily to the hydrophilic surfaces of most aggregates. The adhesion between bitumen and aggregate depends on the chemical nature of the components, and therefore the source of the bitumen and type of aggregate. Aggregate properties such as surface texture, porosity, shape and absorption will also influence the aggregate/bitumen adhesion.

Due to its chemical composition, bitumen has quite a low polarity whereas water is extremely polar. Aggregates may be of an "acidic" type, with surfaces that tend to be negatively charged, or "basic" (also referred to as "alkaline") with surfaces that tend to be positively charged. Acidic aggregates include those with high silica contents, while basic aggregates include carbonates.

It is the function of the adhesion promoter to alter the relative surface properties and polarity of incompatible materials, thus facilitating a strong bond between the bitumen and the aggregate, which resists the water displacing effects for the service life of the pavement.

The adhesion could either be passive or active. Passive adhesion is the ability of a binder (bitumen) to maintain the integrity of the adhesive bond with aggregate to prevent stripping under wet conditions, which can be assured by the addition of an adhesion promoter to the binder. Active adhesion is achieved by the action of the adhesion promoter to decrease the contact angle of the bitumen to aggregate interface, thus allowing the bitumen to displace water and coat the aggregate surface.

There are earlier publications describing the use of phosphated alcohols as adhesion improvers.

EP 0 926 191 relates to an asphalt additive which increases the adhesion between bitumen and aggregates. The asphalt additive comprises at least one phosphated product derived from a monohydric alcohol having either a linear or methyl branched hydrocarbon radical, and which is optionally alkoxylated.

EP 0 157 210 relates to a method for strengthening the adhesion between heated bitumen and aggregates by adding to the bitumen an acidic organophosphorous compound exemplified by e.g. monooleyl phosphate, dioleyl phosphate and phosphate of sorbitan laurate.

FR 2 971 785 relates to the use of a composition comprising at least one phospholipid and at least one salt of a fatty acid to produce a bituminous product, where the bituminous product is an emulsion comprising 0.2-10 wt % of the said composition, 1-80 wt % bitumen and water up to 100 wt %.

However, there is still a need for adhesion promoters having an increased efficiency towards a wide range of aggregates.

SUMMARY OF THE INVENTION

It is an object of the present invention to provide an asphalt additive which is an excellent adhesion promoter.

Another object of the invention is to provide an additive that increases the adhesion of bitumen towards both acidic and basic aggregates.

A third object is to provide an additive that has a good environmental profile.

It has now surprisingly been found that these objects can at least partially be met by using certain phosphate esters as adhesion promoters in bitumen compositions. The phosphate esters can be formed from polyhydric alcohols, which have been esterified with a carboxylic acid and phosphated, or for a specific embodiment, by transesterification of a triglyceride with glycerol, followed by reaction with a phosphatising reagent.

DETAILED DESCRIPTION OF THE INVENTION

A first aspect of the present invention relates to a bitumen containing composition comprising bitumen and a phosphated compound, which is obtainable by the esterification of a polyhydric alcohol having at least three hydroxyl groups, with a carboxylic acid having from 8, preferably from 12, to 24, preferably to 22 carbon atoms, or a derivative thereof, wherein at least one but not all of the hydroxyl groups are esterified, provided that when the polyhydric alcohol has 5 or more hydroxyl groups then at least two but not all of the hydroxyl groups are esterified, followed by reacting the ester obtained with a phosphatising reagent; wherein said composition is not a bitumen-in-water emulsion.

In a first embodiment the phosphated compound has the formula

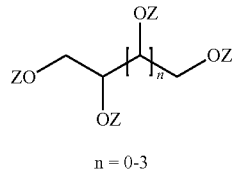

$n = 0-3$ where $Z=-PO_3H$, H or $R-(C=O)-$, where $R-(C=O)-$ is an acyl group having from 8, preferably from 12, to 24, preferably to 22 carbon atoms; and $n=0-3$; provided that at least one Z is $R-(C=O)-$ and at least one Z is $-PO_3H$, provided that when $n=2$ or 3 then at least two Z is $R-(C=O)-$.

In a second embodiment the phosphated compound has the formula

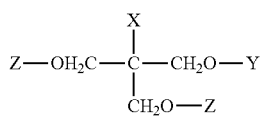

where $X=-CH_2O-Z$ or $-CH_2CH_3$; Z has the same meaning as in formula I; and

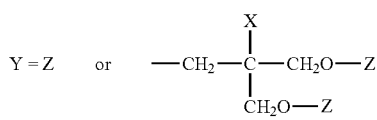

provided that at least one Z is $-PO_3H$ and at least one Z is $R-(C=O)-$.

Suitable polyhydric alcohols to be used as starting materials for products of formula (I) are glycerol, erythritol, threitol, arabitol, xylitol, ribitol, mannitol, sorbitol and galactitol, preferably glycerol.

The carboxylic acids to be used as starting materials for products of formula (I) and (II) may be linear or branched, preferably linear, substituted or unsubstituted, preferably unsubstituted, and saturated or unsaturated, preferably unsaturated. Suitable examples of these acids are for example lauric acid, myristic acid, palmitic acid, stearic acid, arachidic acid, behenic acid, lignoceric acid, palmitoleic acid, oleic acid, gadoleic acid, erucic acid, ricinoleic acid, linoleic acid, linolenic acid, arachidonic acid, and the so-called natural fatty acids, such as coco fatty acid, tallow fatty acid, rape seed fatty acid, soya fatty acid, and tall oil fatty acid (TOFA), Suitable phosphatising agents include polyphosphoric acid (PPA) and diphosphorous pentoxide ($P_2O_5$).

For the compound of formula (I) there is a specific embodiment where $n=0$, at least one and preferably at least two of the Z groups are $R-(C=O)-$ and the remaining Z groups or group is $-PO_3H$. These compounds are known as phospholipids, and may be prepared by methods known in the art (see e.g. GB 1,032,465, DE 24 46 151, U.S. Pat. Nos. 3,875,196 and 2,177,983 for synthesis descriptions). A preferred structure is formed by esterification of 1.5-2 mol of fatty acid with 1 mol of glycerol, followed by reaction of the obtained intermediate with polyphosphoric acid (PPA) or diphosphorus pentoxide ($P_2O_5$).

Alternatively, the compound of formula (I) where $n=0$ can be obtained by transesterification of an oil or fat (triglyceride) with glycerol, typically in a molar ratio triglyceride:glycerol of about 2:1, and typically in the presence of base (eg. KOH), followed by reaction of the obtained intermediate with PPA or $P_2O_5$. The products obtained by the above-mentioned methods are normally mixtures of phosphated mono- and diglycerides, where the main product is a phosphated diglyceride. The product mixture may also contain triglycerides and minor amounts of mono-, di- and triphosphated glycerol.

Also other polyhydric alcohols may be esterified with a carboxylic acid and thereafter phosphated. Another specific embodiment is based on sorbitol ($n=3$), where the product has the formula

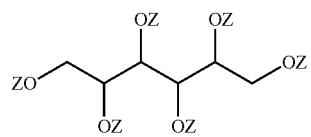

where $Z=-PO_3H$, H or $R-(C=O)-$, provided at least two Z is $R-(C=O)-$, and at least one Z is $-PO_3H$.

A specific embodiment of the compound of formula (II) is where X is $CH_2O-Z$ and Y is Z, where at least one, preferably at least two Z is $R-(C=O)-$, and at least one Z is $-PO_3H$. The starting polyhydric alcohol in this case is pentaerythritol.

Two further specific embodiments of the compound (II) are where X is $-CH_2CH_3$ and

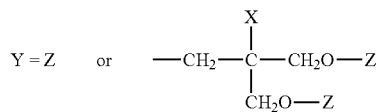

where the starting polyhydric alcohol is trimethylolpropane or di-trimethylolpropane, respectively.

The derivatives that may be used in the esterification reaction instead of the carboxylic acid itself are e.g. an acid chloride, an ester or an anhydride thereof.

The phosphated compounds of the invention having formula (I) are especially preferred, since they have a particularly good environmental profile and a good thermal stability. The most preferred compounds of formula (I) are those where $n=0$.

The bitumen containing composition comprising bitumen and a phosphated compound as defined above, preferably a compound having formula (I) or (II), more preferably formula (I), and most preferably a compound having formula (I) in which n is 0, preferably comprises >90 wt % bitumen and <5 wt % water.

The amount of the phosphated compound to be added to the bitumen containing composition is preferably at least 0.05, more preferably at least 0.1, even more preferably at least 0.2, and most preferably at least 0.3% by weight, and preferably at most 5, more preferably at most 4, even more preferably at most 3 and most preferably at most 2% by weight, based on the amount of bitumen.

The compound of formula (I) or (II) significantly increases the adhesion of bitumen towards both acidic aggregates, such as granite, and alkaline aggregates, such as limestone. A second aspect of the invention is thus a method for strengthening the adhesion between bitumen and aggregates by adding the said bitumen containing composition to the said aggregates, or by first adding the phosphated compound as defined above to the aggregates and thereafter adding the bitumen to the phosphate compound-aggregate mixture.

A third aspect of the invention is an asphalt composition comprising bitumen, a phosphated compound as defined above, preferably a compound having formula (I) or (II), more preferably formula (I), and most preferably a compound of formula (I) where n=0, and aggregates.

The amount of the bitumen containing composition in the final asphalt composition is preferably 1 to 25% by weight, more preferably 2 to 15% by weight and most preferably 3 to 10% by weight of the final composition. The amount of aggregates in the final asphalt composition is preferably 75 to 99% by weight of the final composition.

Bitumen (in North America also referred to as "asphalt") is one of the heavier, if not the heaviest, portions from the oil distillation process. Due to the different origins and distillation processes of such oils, the resulting bitumen may have a wide range of properties and characteristics.

Binder is herein defined as bitumen or bitumen including additives, such as the phosphated compounds described herein.

As used in the present invention the term "asphalt" refers to a composition comprising binder and aggregates.

As used in the present invention, the term "bitumen" refers not only to the product from oil by direct distillation or from distillation of oil at reduced pressures, but also to the product resulting from the extraction of tar and bituminous sands, the product of oxidation and/or fluxation of such bituminous materials, as well as blown or semi-blown bitumens, synthetic bitumens (such as described in FR 2 853 647-A1), tars, oil resins or indene-coumarone resins mixed with aromatic and/or paraffinic hydrocarbons, chemically modified bitumen, such as polymer modified bitumen and/or acid modified bitumen, and mixtures thereof.

So-called cut-back bitumen, i.e. bitumen diluted with a petroleum solvent, such as e.g. naphtha, kerosene and/or diesel to lower its viscosity, is also within the definition of "bitumen" as used herein. However, preferred bitumen for use in the present invention comprises at most 5 wt %, preferably at most 4 wt % of petroleum solvents, such as naphtha, kerosene and/or diesel.

The adhesion promoter of the present invention is thus not restricted to be used with any specific kind of bitumen.

Normally the adhesion promoting phosphated compound of the invention would be added to the bitumen, and this mixture thereafter added to the aggregates. Alternatively the phosphated compound could first be added to the aggregates and thereafter the bitumen added to the phosphated compound-aggregate mixture.

The asphalt comprising the additive of the invention could be used in different paving methods, such as with hot mixes, warm mixes, soft bitumen mixes and foamed bitumen, preferably with hot mixes. It may be used for paving a road, a sidewalk, a parking lot or an airport runway. It may also be used in asphalt roofing applications, sealants and coatings, such as roofing shingles and driveway sealers.

A suitable method for paving comprises the steps of
mixing the bitumen composition as defined above with aggregates to form a mixture having a temperature of 100-190° C.
applying said mixture to a surface
optionally compacting said mixture.

The above method is preferably a conventional hot-mix or warm-mix paving method.

Bitumen may comprise minor amounts of water dispersed therein. Preferably, bitumen contemplated for use in the present invention comprises less than 5, preferably less than 4, and most preferably less than 1 wt % water, and is typically essentially anhydrous.

As used herein, the term "aggregate" relates to divided materials from quarries, stone material, bituminous mix aggregates, such as from reclaimed asphalt, milled fragments, clinker, scoria, slag and concrete.

The mean size of the aggregates is typically less than 5, preferably less than 3 cm in any dimension, and typically has a mean size of at least 0.1 cm, preferably at least 0.3 cm in at least one dimension. It is however to be recognized that the aggregates often comprises a portion of filler particles, which are finely divided materials having a particle size of below 75 µm.

The aggregates used could be either acidic or basic. Acidic aggregates include those with high silica contents, while basic aggregates include carbonates. Non-limiting examples of suitable aggregates are limestone, sandstone, granite and diabase.

Hot-mix asphalt (HMA) is produced by mixing heated bitumen and heated, dried aggregates in the right proportions to obtain the product mixture that is desired. The production temperature is generally 120-190° C., typically 150-180° C., and depends on the bitumen that is used. A proper aggregate temperature is essential, since it is mainly the temperature of the aggregate that controls the temperature of the asphalt mixture. Warm-mix asphalt (WMA) is a variation of traditional HMA, using processes or additives to HMA that allow mixture production and placement to occur at temperatures lower than conventional HMA without sacrificing performance. To make the WMA process possible, technologies including chemical binder additives, chemical mixture additives, foaming admixtures and plant modifications may be used. The process temperature for a WMA is roughly between 100 and 140° C., which is typically 20-40° C. lower than for an equivalent HMA, i.e. as for a HMA having the same type of bitumen and aggregates. In the HMA and WMA the bitumen is not in the form of an emulsion.

The asphalt composition may further comprise minor amounts of other additives commonly used in the art.

The invention is further illustrated by the working examples below.

EXPERIMENTAL

Example 1

Synthesis of Phospholipids (I)

TABLE 1

The amount of the reagents used for the reaction and specifications on raw materials

| Molar ratio | n, mol | Mw, g/mol | m, g | Reagent |
|---|---|---|---|---|
| 1.80 | 1.28 | 282.8 | 361.98 | Sylfat ™ 2 (ex Arizona Chemical)[1] |
| 1.00 | 0.713 | 92.09 | 65.7 | Glycerol |
| 1.00 | 0.713 | 142 | 101.2 | Polyphosphoric acid (PPA) |

[1]Tall Oil Fatty Acid (TO-2)

Procedure

TO-2 and glycerol were added to a round bottom flask equipped with a thermometer, a heating mantle, distillation set up, a nitrogen/vacuum inlet and a mechanical stirrer. The reaction mixture was heated up to 165° C. and the reaction water was distilled off. The distillation was carried out under vacuum (30 mbar) at 165° C. for approximately 13 hours. The progress of the reaction was evaluated by determination of acid value and by $^1$H NMR, and the conversion was around 90%.

Polyphosphoric acid was added to the reaction mixture using a dropping funnel, keeping the temperature between 57 and 64° C. The post reaction was carried out at 65° C. and atmospheric pressure under vigorous mixing for approximately 3 hours. 471 g of the product was collected.

Example 2

Synthesis of Oleyl Phosphate (OleylPPA; Comparison Product)

TABLE 1

The amount of the reagents used for the reaction and specifications on raw materials

| Molar ratio | n, mol | Mw, g/mol | m, g | Reagent |
|---|---|---|---|---|
| 1.00 | 0.767 | 268 | 205.6 | Synative AL 90/95 V (ex Cognis)[2] |
| 1.00 | 0.767 | 142 | 108.9 | Polyphosphoric acid (PPA) |

[2]Oleyl/Cetyl alcohol, based on vegetable raw material (linear, mainly unsaturated alcohol)

Procedure

Synative AL 90/95 V was added to a round bottom flask equipped with a thermometer, a nitrogen inlet, a heating mantle, a mechanical stirrer and a dropping funnel. The reagent was heated to 65° C. under stirring. Polyphosphoric acid was added in portions to the flask with a dropping funnel during 30 min. keeping the temperature between 54 and 74° C. The reaction mixture was then heated at 70° C. for 1 h. 297.3 g of the product was collected. The product was evaluated by $^1$H-NMR spectroscopy.

Example 3

Synthesis of Oleyl Phosphate[3] (OleylP2O5; Comparison Product)

TABLE 2

The amount of the reagents used for the reaction and specifications on raw materials

| Molar ratio | n, mol | Mw, g/mol | m, g | Reagent |
|---|---|---|---|---|
| 1.00 | 0.94 | 277 | 260 | Synative AL 90/95 V (ex Cognis) |
| 0.39 | 0.37 | 142 | 53.2 | Phosphorous pentoxide ($P_2O_5$) |

[3]This product contains about equal amounts of mono- and dialkyl phosphate

Procedure

Synative AL 90/95 V was added to a round bottom flask equipped with a thermometer, a nitrogen inlet, a heating mantle, a mechanical stirrer and a funnel. The reagent was heated to 45° C. under stirring. Phosphorous pentoxide (39.9 g) was added to the flask in portions during 1 h, keeping the temperature between 45 and 68° C. An additional portion of $P_2O_5$ (13.3 g) was added and the reaction was heated for 5 h at 65° C. 302.5 g of the product was collected.

The final product was evaluated by $^1$H-NMR and $^{31}$P-NMR.

Example 4

General Method for Determination of Adhesion

This method was designed to test the passive adhesion (water sensibility) between an aggregate and a binder. It can also be used to test the effect of an adhesion agent.

Dried and cleaned aggregates (8.0-11.2 mm) were covered with a binder (3.5% by weight). The covered aggregates were transferred to a bottle, which was filled with water and placed in a warm water-bath.

Observations were made after 24 hours and the percentage of stone surface that remained coated was noted.

Procedure

Aggregates, Granite (acidic) and Diabase (alkaline) were sieved to 8.0-11.2 mm, thoroughly washed, rinsed with deionized/distilled water and dried at 150° C. for 5 hours. 230 g aggregate was prepared in a mixing vessel and the mixing vessels with aggregate was placed in an oven set at mixing temperature (165° C.) 2 hours before mixing. Bitumen (Shell, Pen 70/100) was weighed out in 150 ml closed tin cans, each containing 50±0.2 g. The tin cans with the bitumen were put into an oven set at mixing temperature (165° C.) about 3 hours before mixing.

The adhesion promoter was weighed into the warm bitumen 30±10 minutes before mixing with the aggregate. The adhesion promoter and the bitumen were thoroughly mixed by means of a spatula for 30 seconds.

The adhesion promoters were added to the bitumen in the following amounts:

| Adhesion Promoter | Dosage (g) | Dosage (%) of total | Bitumen (g) | Total (g) |
|---|---|---|---|---|
| OleylPPA (Comparison) | 0.256 | 0.508 | 50.20 | 50.458 |
| OleylP2O5 (Comparison) | 0.256 | 0.507 | 50.18 | 50.436 |
| Phospholipids (I) | 0.258 | 0.511 | 50.20 | 50.456 |
| No additive (Comparison) | — | — | 50.15 | 50.15 |

Procedure

Aggregates and binder were prepared as described above.

To a mixing vessel with aggregates (230 g, 165° C.) the binder (with or without adhesion promoter) (8±0.1 gram, 165° C.) was added. Mixing started within 30±5 sec after the aggregates and the binder had been taken out of the oven. Mixing was done with a spatula for one minute at a rate of about 3 revolutions per second whereupon the aggregates were totally covered with binder.

The coated aggregates were immediately put into a glass bottle and left at room temperature to cool over night.

The water-bath temperature was held at 60° C. approximately 3 hours before the transfer of the coated aggregate to the bottles. The bottles with aggregate-binder were filled with deionized/distilled water and placed in the water-bath at 60° C. for 24 hours.

After 24 hours of immersion, the state of the coated aggregates in water was visually inspected. By this inspection, the area percentage of the aggregates coated by the binder was estimated.

| Adhesion promoter | Granite | Diabase |
|---|---|---|
| Phospholipid (I) | 95 | 95 |
| OleylPPA (Comparison) | 80 | 95 |

-continued

| Adhesion promoter | Granite | Diabase |
|---|---|---|
| OleylP$_2$O$_5$ (Comparison) | 60 | 85 |
| No additive (Comparison) | 10 | 75 |

The invention claimed is:

1. A bitumen containing composition comprising bitumen and a phosphate compound, the phosphate compound prepared by the esterification of a polyhydric alcohol having at least three hydroxyl groups, with a carboxylic acid having 8-24 carbon atoms, or a derivative thereof, wherein at least one but not all of the hydroxyl groups are esterified, provided that when the polyhydric alcohol has 5 or more hydroxyl groups, then at least two but not all of the hydroxyl groups are esterified, followed by reacting the ester obtained with a phosphatising reagent;

wherein the said composition is not a bitumen-in-water emulsion.

2. The composition according to claim 1, wherein the phosphated compound has the formula:

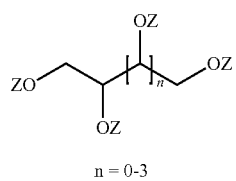

(I)

n = 0-3 where Z=—PO$_3$H, H or R—(C=O)—, where R—(C=O)— is an acyl group having 8-24 carbon atoms; and n=0-3; provided that at least one Z is R—(C=O)— and at least one Z is —PO$_3$H, provided that when n=2 or 3 then at least two Z is R—(C=O)—; or the formula:

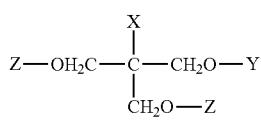

(II)

where X=—CH$_2$O—Z or —CH$_2$CH$_3$; Z has the same meaning as in formula I; and

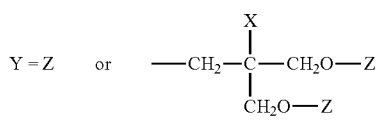

provided that at least one Z is —PO$_3$H and at least one Z is R—(C=O)—.

3. The composition according to claim 2, wherein in formula (I), n=0.

4. The composition according to claim 2, wherein in formula (I), n=3.

5. The composition according to claim 2, wherein in formula (II), X is CH$_2$O—Z and Y is Z.

6. The composition according to claim 2, wherein in formula (II), X is —CH$_2$CH$_3$ and

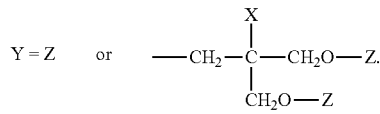

7. The composition according to claim 3, wherein said phosphate compound is prepared by the steps of transesterification of a triglyceride with glycerol, followed by reaction with a phosphatising reagent.

8. The composition according to claim 1, further comprising less than 5 wt % water.

9. The composition according to claim 8, wherein the phosphate compound is 0.05 to 5% by weight, based on the amount of bitumen.

10. A method for strengthening adhesion between bitumen and aggregates comprising the step of:

adding the bitumen containing composition of claim 1 to the said aggregates.

11. An asphalt composition comprising the bitumen containing composition of claim 1 and aggregates.

12. The asphalt composition according to claim 11, comprising from 1 to 25% by weight of the bitumen, and 75 to 99% by weight of the aggregates.

13. A method for paving a road, a sidewalk, a parking lot or an airport runway comprising the step of:

applying the asphalt composition of claim 11 to a road surface, a sidewalk surface, parking lot surface, or an airport runway surface.

14. The method according to claim 13, wherein the paving method is a hot-mix or warm-mix paving procedure.

15. A method for paving comprising the steps of:

mixing the bitumen composition of claim 1 with aggregates to form a mixture having a temperature of 100-190° C.; and applying said mixture to a surface.

16. The bitumen containing composition of claim 1, wherein the carboxylic acid has 12-22 carbon atoms.

17. A method for strengthening adhesion between bitumen and aggregates comprising the step of:

adding the phosphated compound of claim 1 to the aggregates to form a phosphate compound-aggregate mixture, and thereafter adding the bitumen to the phosphated compound-aggregate mixture.

18. The method of claim 15, further comprising the step of compacting said mixture after it was applied to the surface.

19. A bitumen containing composition comprising bitumen and a phosphate compound, the phosphate compound prepared by the esterification of a polyhydric alcohol having at least three hydroxyl groups, with a carboxylic acid having 8-24 carbon atoms, or a derivative thereof, wherein at least one but not all of the hydroxyl groups are esterified, provided that when the polyhydric alcohol has 5 or more hydroxyl groups, then at least two but not all of the hydroxyl groups are esterified, followed by reacting the ester obtained with a phosphatising reagent, and wherein the phosphated compound has the formula:

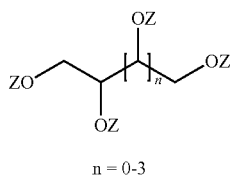

(I)

n = 0-3 where Z=—PO$_3$H, H or R—(C=O)—, where R—(C=O)— is an acyl group having 8-24 carbon atoms; and n=0-3; provided that at least one Z is R—(C=O)— and at least one Z is —PO$_3$H, provided that when n=2 or 3 then at least two Z is R—(C=O)—; or the formula:

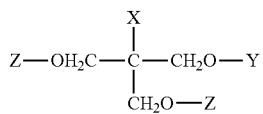

(II)

where X=—CH$_2$O=Z or —CH$_2$CH$_3$; Z has the same meaning as in formula I; and

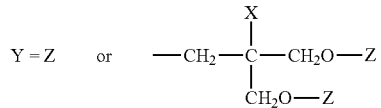

provided that at least one Z is —PO$_3$H and at least one Z is R—(C=O)—, and further wherein where n=0 in formula (I), the phosphate compound is prepared by the steps of transesterification of a triglyceride with glycerol, followed by reaction with a phosphatising reagent, and further wherein the composition comprises less than 5 wt % water, and further wherein bitumen is present in an amount of greater than 90 wt %.

* * * * *